United States Patent
Karikari et al.

(10) Patent No.: US 10,982,175 B2
(45) Date of Patent: Apr. 20, 2021

(54) FREE STANDING FILM

(71) Applicants: Rohm and Haas Company, Collegeville, PA (US); Dow Global Technologies LLC, Midland, MI (US)

(72) Inventors: Afua Sarpong Karikari, Bristol, PA (US); Xin Jin, Berwyn, PA (US); Joseph Kao, Framingham, MA (US); An Kaga, Rosharon, TX (US); Gyongyi Gulyas, Lake Jackson, TX (US); Michael C. Mitchell, King Prussia, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 10 days.

(21) Appl. No.: 16/477,291

(22) PCT Filed: Mar. 19, 2018

(86) PCT No.: PCT/US2018/023126
§ 371 (c)(1),
(2) Date: Jul. 11, 2019

(87) PCT Pub. No.: WO2018/183016
PCT Pub. Date: Oct. 4, 2018

(65) Prior Publication Data
US 2020/0010783 A1    Jan. 9, 2020

Related U.S. Application Data

(60) Provisional application No. 62/478,816, filed on Mar. 30, 2017.

(51) Int. Cl.
| | | |
|---|---|---|
| C11D 17/04 | (2006.01) | |
| C11D 3/08 | (2006.01) | |
| C11D 3/37 | (2006.01) | |
| C08J 5/18 | (2006.01) | |
| C11D 3/20 | (2006.01) | |
| C11D 11/00 | (2006.01) | |

(52) U.S. Cl.
CPC ............. *C11D 17/043* (2013.01); *C08J 5/18* (2013.01); *C11D 3/08* (2013.01); *C11D 3/2044* (2013.01); *C11D 3/3707* (2013.01); *C11D 3/3753* (2013.01); *C11D 3/3765* (2013.01); *C11D 3/3776* (2013.01); *C11D 11/0017* (2013.01); *C08J 2329/04* (2013.01); *C08J 2371/02* (2013.01); *C08J 2423/22* (2013.01); *C08J 2429/04* (2013.01); *C08J 2429/14* (2013.01); *C08J 2435/02* (2013.01); *C08J 2439/06* (2013.01); *C08J 2471/02* (2013.01)

(58) Field of Classification Search
None
See application file for complete search history.

(56) References Cited

U.S. PATENT DOCUMENTS

| | | |
|---|---|---|
| 6,787,512 B1 | 9/2004 | Verrall et al. |
| 7,022,656 B2 | 4/2006 | Verrall et al. |
| 2006/0281658 A1 | 12/2006 | Kellar et al. |
| 2011/0186467 A1* | 8/2011 | Denome ............... B65D 65/46 206/524.7 |
| 2016/0024446 A1 | 1/2016 | Lee et al. |
| 2016/0102278 A1 | 4/2016 | Labeque et al. |
| 2016/0102279 A1 | 4/2016 | Labeque et al. |
| 2018/0057649 A1* | 3/2018 | Jin ....................... B32B 27/306 |
| 2018/0355135 A1* | 12/2018 | Jin ....................... C11D 17/042 |

FOREIGN PATENT DOCUMENTS

| | | |
|---|---|---|
| WO | 2011094470 A1 | 8/2011 |
| WO | 2016040629 A1 | 3/2016 |
| WO | 2016060945 A1 | 4/2016 |

* cited by examiner

*Primary Examiner* — Lorna M Douyon
(74) *Attorney, Agent, or Firm* — Thomas S. Deibert

(57) ABSTRACT

A free standing film is provided including: a partially hydrolyzed polyvinyl acetate; a poly(ethylene oxide); a polyalkylene glycol; a plasticizer; optionally, a poly(isobutylene-co-maleic anhydride) copolymer; and optionally an additive. Unit dose packages including the free standing film are also provided.

9 Claims, No Drawings

FREE STANDING FILM

The present invention relates to a free standing film. In particular, the present invention relates to a formulation for the free standing film and to a unit dose package made with the free standing film.

Conventional water-soluble polymeric films have found use as packaging materials that facilitate the simplification of dispersing, pouring, dissolving and dosing of materials to be delivered. For example, packages prepared from conventional water-soluble films are commonly used to contain a premeasured unit dose of a household care composition, such as, a dish or laundry detergent formulation. The consumer may then directly add the household care compositions containing package to a mixing vessel for use. This approach advantageously allows for the accurate dosing of the household care composition while eliminating the need for the consumer to have to measure out the composition. This approach also advantageously may reduce mess that might otherwise be associated with consumer dispensing of the composition.

Many conventional water-soluble films fail to adequately dissolve during use, e.g., during a laundry wash cycle, resulting in an undesirable film residue being deposited on the laundry. This concern may be exacerbated when the conditions of use introduce stressed wash conditions, such as when the package is used in cold water. Given the desire to reduce energy costs, consumers are increasingly in need of unit dosage systems that will perform reliably in cold water conditions.

Many conventional water-soluble films that do completely dissolve during use, e.g., during a laundry wash cycle, using cold water unfortunately exhibit an undesirable degree of sensitivity to moisture and humidity. That is, these films when incorporated into unit dose pouches exhibit insufficient storage stability, particularly when the contained detergent includes higher water concentrations. These films also display handling concerns when incorporated into unit does pouches (e.g., handling of the pouches with wet hands may result in the packages adhering to one another or leakage of their contents).

Conventional unit dose packages produced with films comprising polyvinyl alcohol polymers have addressed the some of the aforementioned issues with limited success. However, the cold water solubility of some polyvinyl alcohol films may decrease when contacted with certain detergent compositions. Consequently, as these unit dose packages age, the films may fail to adequately dissolve during a cold wash cycle, and may in turn leave undesirable film residue on items within the wash.

Conventional unit dose packages made from water-soluble films comprising polymers other than polyvinyl alcohol polymers may fail to adequately address the aforementioned concerns. For example, a polymeric film comprising starch and/or cellulosic materials may provide suitable water-drop resistance. However, to facilitate desirable cold water solubility such films may need to be made so thin that the resulting mechanical properties are compromised. Moreover, films comprising starch and/or cellulosic materials are more challenging to process given their mechanical properties as compared to films of like thickness comprising polyvinyl alcohol polymers.

Conventional film formulations fail to perform adequately. Thus, there remains a need for packets comprising water-soluble films having the desired characteristics of good cold water-solubility, water-drop resistance, and mechanical properties including, but not limited to, good processability.

There remains a need for water soluble films and unit dose packages produced therewith having the desired characteristics of good cold water-solubility, water-drop resistance, and mechanical properties, including, but not limited to, processability.

The present invention provides a free standing film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 0 to 10 wt % of a poly(isobutylene-co-maleic anhydride) copolymer, wherein the poly(isobutylene-co-maleic anhydride) copolymer is at least partially neutralized; and 0 to 10 wt % of an optional additive.

The present invention provides a free standing film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 1 to 7.5 wt % of a poly(isobutylene-co-maleic anhydride) copolymer, wherein the poly(isobutylene-co-maleic anhydride) copolymer is at least partially neutralized; and 0 to 10 wt % of an optional additive.

The present invention provides a free standing film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 0 to 10 wt % of a poly(isobutylene-co-maleic anhydride) copolymer, wherein the poly(isobutylene-co-maleic anhydride) copolymer is at least partially neutralized; and 0 to 10 wt % of an optional additive.

The present invention provides a free standing film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 0.01 to 1.8 wt % of a polyvinyl pyrrolidone; 0 to 10 wt % of a poly(isobutylene-co-maleic anhydride) copolymer, wherein the poly(isobutylene-co-maleic anhydride) copolymer is at least partially neutralized; and 0 to 10 wt % of an optional additive; wherein the weight ratio of the partially hydrolyzed polyvinyl acetate to the polyvinyl pyrrolidone is >10:1.

The present invention provides a free standing film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 0.01 to 1.8 wt % of a polyvinyl pyrrolidone; 1 to 7.5 wt % of a poly(isobutylene-co-maleic anhydride) copolymer is at least partially neutralized; and 0 to 10 wt % of an optional additive; and 0 to 10 wt % of at least one optional additive; wherein the weight ratio of the partially hydrolyzed polyvinyl acetate to the polyvinyl pyrrolidone is >10:1; wherein the at least one optional additive includes a nano clay and a defoamer; and wherein the free standing film contains: 0.1 to 0.5 wt % of the nano clay; and 3 to 7 wt % of the defoamer.

The present invention provides a unit dose package, comprising: a free standing film of the present invention; and a detergent formulation, comprising: 14 to 60 wt % of a surfactant; 3 to 25 wt % of a salt; and 20 to 75 wt % of a water; wherein the free standing film forms a cavity; wherein the detergent formulation is disposed within the cavity; and wherein the detergent formulation is in contact with the free standing film.

DETAILED DESCRIPTION

We have found a unique water soluble film formulation that exhibits improved resistance to detergent formulations with a high water content (i.e., >20 wt %). Unit dose packages made using the water soluble film formulation of the present invention facilitate incorporation of high water content detergent formulations, exhibit acceptable storage stability and water solubility in use post storage.

Unless otherwise indicated, ratios, percentages, parts, and the like are by weight.

As used herein, unless otherwise indicated, the phrase "molecular weight" or Mw refers to the weight average molecular weight as measured in a conventional manner with gel permeation chromatography (GPC) and polyacrylic acid standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Molecular weights are reported herein in units of Daltons.

The term "polymer" as used herein and in the appended claims refers to a compound prepared by polymerizing monomers, whether of the same or a different type. The generic term "polymer" includes the terms "homopolymer," "copolymer," and "terpolymer."

The term "water soluble" as used herein in reference to a free standing film of the present invention means that a sample of the free standing film (0.5"×1.5"×76 μm) when placed in 20 mL of tap water having a temperature of 5 to 25° C. in a sample vial; left to sit undisturbed for two (2) minutes; then shaken for sixty (60) seconds and then filtered through a 0.025 mm mesh screen, wherein only a slight haze is perceptible and no residue or grit is observed according to the procedure set forth herein in the Examples. Preferably, the free standing films of the present invention are also water soluble based on film solubility tests conducted according to MSTM (MonoSol Standard Test Method) 205 in distilled water at 25° C.

Preferably, the free standing film of the present invention, comprises: 19 to 85 wt % (preferably, 20 to 80 wt %; more preferably, 30 to 75 wt %; most preferably, 34 to 70 wt %) of a partially hydrolyzed (preferably, 80 to 98% hydrolyzed) polyvinyl acetate; 5 to 70 wt % (preferably, 6 to 65 wt %; more preferably, 7.5 to 50 wt %; most preferably, 10 to 15 wt %) of a poly(ethylene oxide); 1 to 35 wt % (preferably, 2 to 35 wt %; more preferably, 3 to 35 wt %; most preferably, 4 to 7.5 wt %) of a polyalkylene glycol; 0.5 to 25 wt % (preferably 10 to 25 wt %; more preferably, 10 to 20 wt %; most preferably, 12 to 20 wt %) of a plasticizer; 0 to 10 wt % (preferably, 1 to 7.5 wt %; more preferably, 3 to 6 wt %; most preferably, 4 to 5.5 wt %) of a poly(isobutylene-co-maleic anhydride) copolymer, wherein the poly(isobutylene-co-maleic anhydride) copolymer is at least partially neutralized; and 0 to 10 wt % of an optional additive.

Preferably, the partially hydrolyzed polyvinyl acetate used in the free standing film of the present invention is 80 to 98% hydrolyzed. More preferably, the partially hydrolyzed polyvinyl acetate used in the free standing film of the present invention is 84 to 95% hydrolyzed. Still more preferably, the partially hydrolyzed polyvinyl acetate used in the free standing film of the present invention is 86 to 92% hydrolyzed. Most preferably, the partially hydrolyzed polyvinyl acetate used in the free standing film of the present invention is 87 to 90% hydrolyzed.

Preferably, the partially (preferably, 80 to 98%; more preferably, 84 to 95%; still more preferably, 86 to 92%; most preferably, 87 to 90%) hydrolyzed polyvinyl acetate used in the free standing film of the present invention has a weight average molecular weight of 10,000 to 125,000 Daltons. More preferably, the partially (preferably, 80 to 98%; more preferably, 84 to 95%; still more preferably, 86 to 92%; most preferably, 87 to 90%) hydrolyzed polyvinyl acetate used in the free standing film of the present invention has a weight average molecular weight of 20,000 to 100,000 Daltons. Still more preferably, the partially (preferably, 80 to 98%; more preferably, 84 to 95%; still more preferably, 86 to 92%; most preferably, 87 to 90%) hydrolyzed polyvinyl acetate used in the free standing film of the present invention has a weight average molecular weight of 40,000 to 160,000 Daltons. Most preferably, the partially (preferably, 80 to 98%; more preferably, 84 to 95%; still more preferably, 86 to 92%; most preferably, 87 to 90%) hydrolyzed polyvinyl acetate used in the free standing film of the present invention has a weight average molecular weight of 130,000 to 150,000 Daltons.

Preferably, the free standing film of the present invention, comprises 19 to 85 wt % of the partially (preferably, 80 to 98%; more preferably, 84 to 95%; still more preferably, 86 to 92%; most preferably, 87 to 90%) hydrolyzed polyvinyl acetate based on weight of the free standing film. More preferably, the free standing film of the present invention, comprises 20 to 80 wt % of the partially (preferably, 80 to 98%; more preferably, 84 to 95%; still more preferably, 86 to 92%; most preferably, 87 to 90%) hydrolyzed polyvinyl acetate based on weight of the free standing film. Still more preferably, the free standing film of the present invention, comprises 30 to 75 wt % of the partially (preferably, 80 to 98%; more preferably, 84 to 95%; still more preferably, 86 to 92%; most preferably, 87 to 90%) hydrolyzed polyvinyl acetate based on weight of the free standing film. Most preferably, the free standing film of the present invention, comprises 34 to 70 wt % of the partially (preferably, 80 to 98%; more preferably, 84 to 95%; still more preferably, 86 to 92%; most preferably, 87 to 90%) hydrolyzed polyvinyl acetate based on weight of the free standing film.

Preferably, the free standing film of the present invention, comprises 19 to 85 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 125,000 (preferably, 20,000 to 100,000; more preferably, 40,000 to 160,000; most preferably, 130,000 to 150,000) Daltons. More preferably, the free standing film of the present invention, comprises 20 to 80 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 125,000 (preferably, 20,000 to 100,000; more preferably, 40,000 to 160,000; most preferably, 130,000 to 150,000) Daltons. Still more preferably, the free standing film of the present invention, comprises 30 to 75 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 125,000 (preferably, 20,000 to 100,000; more preferably, 40,000 to 160,000; most preferably, 130,000 to 150,000) Daltons. Most preferably, the free standing film of the present invention, comprises 34 to 70 wt % of the partially (preferably, 80 to 98%; more preferably, 84 to 95%; still more preferably, 86 to 92%; most preferably, 87 to 90%) hydrolyzed polyvinyl acetate based on weight of the free standing film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 125,000 (preferably, 20,000 to 100,000; more preferably, 40,000 to 160,000; most preferably, 130,000 to 150,000) Daltons.

Preferably, the poly(ethylene oxide) used in the free standing film of the present invention has a weight average molecular weight of 20,000 to 2,000,000 Daltons. More preferably, the poly(ethylene oxide) used in the free standing film of the present invention has a weight average molecular weight of 100,000 to 1,000,000 Daltons. Still more preferably, the poly(ethylene oxide) used in the free standing film of the present invention has a weight average molecular weight of 250,000 to 750,000 Daltons. Most preferably, the poly(ethylene oxide) used in the free standing film of the present invention has a weight average molecular weight of 350,000 to 650,000 Daltons.

Preferably, the free standing film of the present invention, comprises 5 to 70 wt % of the poly(ethylene oxide), based on weight of the free standing film. More preferably, the free standing film of the present invention, comprises 6 to 65 wt % of the poly(ethylene oxide), based on weight of the free standing film. Still more preferably, the free standing film of the present invention, comprises 7.5 to 50 wt % of the poly(ethylene oxide), based on weight of the free standing film. Most preferably, the free standing film of the present invention, comprises 10 to 15 wt % of the poly(ethylene oxide), based on weight of the free standing film.

Preferably, the free standing film of the present invention, comprises 5 to 70 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. More preferably, the free standing film of the present invention, comprises 6 to 65 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. Still more preferably, the free standing film of the present invention, comprises 7.5 to 50 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. Most preferably, the free standing film of the present invention, comprises 10 to 15 wt % of the poly(ethylene oxide), based on weight of the free standing film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons.

Preferably, the polyalkylene glycol used in the free standing film of the present invention has a weight average molecular weight of 250 to 5,300 Daltons. More preferably, the polyalkylene glycol used in the free standing film of the present invention has a weight average molecular weight of 500 to 1,500 Daltons. Still more preferably, the polyalkylene glycol used in the free standing film of the present invention has a weight average molecular weight of 750 to 1,200 Daltons. Most preferably, the polyalkylene glycol used in the free standing film of the present invention has a weight average molecular weight of 800 to 1,000 Daltons.

Preferably, the free standing film of the present invention, comprises 1 to 35 wt % of the polyalkylene glycol, based on weight of the free standing film. More preferably, the free standing film of the present invention, comprises 2 to 35 wt % of the polyalkylene glycol, based on weight of the free standing film. Still more preferably, the free standing film of the present invention, comprises 3 to 35 wt % of the polyalkylene glycol, based on weight of the free standing film. Most preferably, the free standing film of the present invention, comprises 4 to 7.5 wt % of the polyalkylene glycol, based on weight of the free standing film.

Preferably, the free standing film of the present invention, comprises 1 to 35 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons. More preferably, the free standing film of the present invention, comprises 2 to 35 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons. Still more preferably, the free standing film of the present invention, comprises 3 to 35 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons. Most preferably, the free standing film of the present invention, comprises 4 to 7.5 wt % of the polyalkylene glycol, based on weight of the free standing film, wherein the polyalkylene glycol used has a weight average molecular weight of 250 to 5,300 (preferably, 500 to 1,500; more preferably, 750 to 1,200; most preferably, 800 to 1,000) Daltons.

Preferably, the polyalkylene glycol used in the free standing film of the present invention is a random copolymer of ethylene oxide and propylene oxide. More preferably, the polyalkylene glycol used in the free standing film of the present invention is a random copolymer of ethylene oxide and propylene oxide, wherein the polyalkylene glycol has a weight average molecular weight of 250 to 5,300 Daltons. Still more preferably, the polyalkylene glycol used in the free standing film of the present invention is a random copolymer of ethylene oxide and propylene oxide, wherein the polyalkylene glycol has a weight average molecular weight of 500 to 1,500 Daltons. Yet still more preferably, the polyalkylene glycol used in the free standing film of the present invention is a random copolymer of ethylene oxide and propylene oxide, wherein the polyalkylene glycol has a weight average molecular weight of 750 to 1,200 Daltons. Most preferably, the polyalkylene glycol used in the free standing film of the present invention is a random copolymer of ethylene oxide and propylene oxide, wherein the polyalkylene glycol has a weight average molecular weight of 800 to 1,000 Daltons.

Preferably, the free standing film of the present invention, comprises 1 to 35 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons. More preferably, the free standing film of the present invention, comprises 2 to 35 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons. Still more preferably, the free standing film of the present invention, comprises 3 to 35 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons. Most preferably, the free standing film of the present invention, comprises 4 to 7.5 wt % of the polyalkylene glycol, based on weight of the free standing film, wherein the polyalkylene glycol used is a random copolymer of ethylene oxide and propylene oxide and has a weight average molecular weight of 250 to 5,300 (preferably, 500 to 1,500; more preferably, 750 to 1,200; most preferably, 800 to 1,000) Daltons.

Preferably, the free standing film of the present invention, comprises 0.5 to 25 wt % of a plasticizer, based on weight of the free standing film. More preferably, the free standing film of the present invention, comprises 10 to 25 wt % of a plasticizer, based on weight of the free standing film. Still more preferably, the free standing film of the present invention, comprises 10 to 20 wt % of a plasticizer, based on weight of the free standing film. Most preferably, the free standing film of the present invention, comprises 12 to 20 wt % of a plasticizer, based on weight of the free standing film.

Preferably, the plasticizer used in the free standing film of the present invention is selected from organic triols, diols and glycols. More preferably, the plasticizer used in the free standing film of the present invention is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol; 2-methyl-1,3-propanediol; diethylene glycol; triethylene glycol; and mixtures thereof. Still more preferably, the plasticizer used in the free standing film of the present invention is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol and mixtures thereof. Most preferably, the plasticizer used in the free standing film of the present invention is 1,4-butanediol and 1,2,3-propanetriol.

Preferably, the free standing film of the present invention, comprises 0 to 10 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). More preferably, the free standing film of the present invention, comprises 1 to 7.5 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). Still more preferably, the free standing film of the present invention, comprises 3 to 6 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). Most preferably, the free standing film of the present invention, comprises 4 to 5.5 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%).

Preferably, the poly(isobutylene-co-maleic anhydride) copolymer used in the free standing film of the present invention has a weight average molecular weight of 50,000 to 500,000 Daltons. More preferably, the poly(isobutylene-co-maleic anhydride) copolymer used in the free standing film of the present invention has a weight average molecular weight of 75,000 to 250,000 Daltons. Still more preferably, the poly(isobutylene-co-maleic anhydride) copolymer used in the free standing film of the present invention has a weight average molecular weight of 100,000 to 200,000 Daltons. Most preferably, the poly(isobutylene-co-maleic anhydride) copolymer used in the free standing film of the present invention has a weight average molecular weight of 140,000 to 180,000 Daltons.

Preferably, the free standing film of the present invention, comprises 0 to 10 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. More preferably, the free standing film of the present invention, comprises 1 to 7.5 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. Still more preferably, the free standing film of the present invention, comprises 3 to 6 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. Most preferably, the free standing film of the present invention, comprises 4 to 5.5 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons.

Preferably, the poly(isobutylene-co-maleic anhydride) compolymer used is at least partially neutralized with at least one of an alkali earth metal hydroxide, an alkaline earth metal hydroxide and an ionomer, wherein the degree of neutralization is 50 to 100% (more preferably, 75 to 100%; most preferably, 95 to 100%). More preferably, the poly (isobutylene-co-maleic anhydride) compolymer used is at least partially neutralized with at least one of an alkali earth metal hydroxide and an alkaline earth metal hydroxide, wherein the degree of neutralization is 50 to 100% (more preferably, 75 to 100%; most preferably, 95 to 100%). Most preferably, the poly(isobutylene-co-maleic anhydride) compolymer used is at least partially neutralized with at least one of sodium hydroxide, potassium hydroxide, magnesium hydroxide and calcium hydroxide, wherein the degree of neutralization is 50 to 100% (more preferably, 75 to 100%; most preferably, 95 to 100%).

Preferably, the free standing film of the present invention, further comprises 0 to 1.8 wt % (more preferably, 0.01 to 1.8 wt %) of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). More preferably, the free standing film of the present invention, comprises 0.01 to 1.0 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Still more preferably, the free standing film of the present invention, comprises 0.05 to 0.5 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Most preferably, the free standing film of the present invention, comprises 0.08 to 0.20 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1).

Preferably, the polyvinyl pyrrolidone used in the free standing film of the present invention has a weight average molecular weight of 5,000 to 2,000,000 Daltons. More preferably, the polyvinyl pyrrolidone used in the free standing film of the present invention has a weight average molecular weight of 10,000 to 1,500,000 Daltons. Still more preferably, the polyvinyl pyrrolidone used in the free standing film of the present invention has a weight average molecular weight of 20,000 to 100,000 Daltons. Most preferably, the polyvinyl pyrrolidone used in the free standing film of the present invention has a weight average molecular weight of 20,000 to 50,000 Daltons.

Preferably, the free standing film of the present invention, comprises 0 to 1.8 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). More preferably, the free standing film of the present invention, comprises 0.01 to 1.0 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Still more preferably, the free standing film of the present invention, comprises 0.05 to 0.50 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Most preferably, the free standing film of the present invention, comprises 0.08 to 0.20 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1).

Preferably, the free standing film of the present invention, comprises 0 to 10 wt % of an optional additive. Preferably, the optional additive used in the free standing film of the present invention is selected from the group consisting of a preservative, an antioxidant, a viscosity modifier, a solubility modifier, an antimicrobial agent, a binder, a chelating, a filler, an extender, a crosslinking agent (e.g., a bivalent metal cation), a defoamer, a salt, a lubricant, a release agent, an anti-blocking agent, a tackifier, a coalescent, a detackifying agent and a nanoparticle (e.g., silicate type nanoclay).

Preferably, the free standing film of the present invention, comprises 0 to 10 wt % of an optional additive, wherein the optional additive includes a nanoparticle (preferably, a silicate type nanoclay). More preferably, the free standing film of the present invention, comprises 0.05 to 1 wt % (more preferably, 0.1 to 0.5 wt %; most preferably, 0.1 to 0.3 wt %) of a nanoparticle (preferably, a silicate type nanoclay). Most preferably, the free standing film of the present invention, comprises 0.1 to 0.3 wt % of a nanoparticle (preferably, a silicate type nanoclay).

Preferably, the free standing film of the present invention, comprises 0 to 10 wt % of an optional additive, wherein the optional additive includes a defoamer. More preferably, the free standing film of the present invention, comprises 1 to 10 wt % (more preferably, 2 to 7.5 wt %; most preferably, 3 to 6 wt %) of a defoamer. Most preferably, the free standing film of the present invention comprises 3 to 6 wt % of a defoamer.

Preferably, the free standing film of the present invention, comprises 0 to 10 wt % of an optional additive, wherein the optional additive includes a crosslinking agent. More preferably, the free standing film of the present invention, comprises 0.1 to 10 wt % (more preferably, 0.1 to 5 wt %; still more preferably, 0.2 to 3 wt %; most preferably, 0.3 to 1 wt %) of a crosslinking agent.

Preferably, the crosslinking agent used in the free standing film of the present invention is an ionic crosslinking agent. More preferably, the crosslinking agent used in the free standing film of the present invention is selected from the group of cations consisting of $Ca^{2+}$, $Mg^{2+}$, $Al^{2+}$, $Al^{3+}$, $Zn^{2+}$ and mixtures thereof. Still more preferably, the crosslinking agent used in the free standing film of the present invention is selected from the group of cations consisting of $Ca^{2+}$, $Zn^{2+}$ and mixtures thereof. Preferably, the cations are provided as a water soluble inorganic salt or complex, for example, $CaCl_2$, $ZnO$, Zinc ammonium bicarbonate.

Preferably, the free standing film of the present invention is water soluble.

Preferably, the free standing film of the present invention is cold water soluble.

The water soluble films of the present invention can be prepared by techniques known to those skilled in the art including, for example, via solution casting on a substrate, such as glass, polyethylene terephthalate (PET) or metal. Typically, water is used as the solvent for the solution casting, although other solvents may be used. Following casting, the films may be dried by heating at elevated temperature, for instance 65-80° C.

The free standing film of the present invention has utility as a water soluble (preferably, cold water soluble) packaging film that facilitates dosing of materials, for example, a premeasured unit dose of a household care composition, such as, a dish or laundry detergent formulation. Preferably, the free standing film of the present invention forms a cavity. More preferably, the free standing film of the present invention forms a cavity, wherein the cavity is encapsulated by the free standing film.

Preferably, the unit dose package of the present invention, comprises: a free standing film of the present invention; and a detergent formulation. More preferably, the unit dose package of the present invention, comprises: a free standing film of the present invention; and a detergent formulation; wherein the free standing film forms a cavity; wherein the detergent formulation is disposed within the cavity; and wherein the detergent formulation is in contact with the free standing film. Most preferably, the unit dose package of the present invention, comprises: a free standing film of the present invention; and a detergent formulation; wherein the free standing film forms a cavity; wherein the detergent formulation is disposed within the cavity; wherein the free standing film encapsulates the cavity; and wherein the detergent formulation is in contact with the free standing film.

Preferably, the detergent formulation used in the unit dose package of the present invention, comprises: 14 to 60 wt % (preferably, 20 to 50 wt %; more preferably, 25 to 47.5 wt %; still more preferably, 30 to 45 wt %; most preferably, 40 to 42 wt %) of a surfactant; 3 to 25 wt % (preferably, 3 to 20 wt %; more preferably, 4 to 15 wt %; still more preferably, 5 to 10 wt %; most preferably, 5 to 7 wt %) of a salt; and 20 to 75 wt % (preferably, 30 to 70 wt % water; more preferably, 40 to 65 wt %; most preferably, 45 to 60 wt %) of a water; wherein the free standing film forms a cavity; wherein the detergent formulation is disposed within the cavity; and wherein the detergent formulation is in contact with the free standing film.

Preferably, the surfactant used in the detergent formulation in the unit dose package of the present invention is selected from the group consisting of cationic, anionic, nonionic, fatty acid metal salt, zwitterionic (e.g., betaine surfactants) and mixtures thereof.

The amount of salt noted in the detergent formulation does not include any anionic or cationic surfactants present in the detergent.

Preferably, the salt used in the detergent formulation in the unit dose package of the present invention has no more than ten (more preferably, no more than six; most preferably, no more than 3) carbon atoms. Preferably, the salt used in the detergent formulation in the unit dose package of the present invention is selected from the group consisting of chlorides, citrates, phosphates, sulfates, carbonates, metalsilicates and aluminosilicates. Preferably, the cations of the salt used in the detergent formulation in the unit dose package of the present invention are selected from alkali metal ions, ammonium ions and mixtures thereof. Preferably, the detergent formulation used in the unit dose package of the present invention, comprises a salt selected from the group consisting of sodium chloride, ammonium chloride and ammonium sulfate. More preferably, the detergent formulation used in the unit dose package of the present invention, comprises a salt selected from the group consisting of sodium chloride, ammonium chloride and mixtures thereof.

Preferably, the detergent formulation used in the unit dose package of the present invention, further comprises an optional component selected from the group consisting of a preservative, an antioxidant, a viscosity modifier, a solubility modifier, an antimicrobial agent, a binder, a chelating agent, a fungicide, an aesthetics enhancer and a filler.

Preferably, the pH of the detergent formulation used in the unit dose package of the present invention is 4.5 to 11 (more preferably, 7 to 10). Suitable bases to adjust the pH of the detergent formulation include mineral bases such as sodium hydroxide and potassium hydroxide; ammonium hydroxide; and organic bases such as mono-, di- or tri-ethanolamine; or 2-dimethylamino-2-methyl-1-propanol (DMAMP). Mixtures of bases may be used.

The water soluble film used in the unit dose package of the present invention is stable in the presence of high ionic strength detergents (containing salts in amounts as described above). In use, the detergent contents of the unit dose package of the present invention may be released by exposing the unit dose package to low ionic strength water (e.g., containing less than 3 wt % salts), for instance as may be encountered during the wash cycle of a laundry machine. Following such exposure, the water soluble film will readily disintegrate, releasing the detergent formulation into the surroundings.

Preferably, the water soluble film used in the unit dose package of the present invention forms a sealed container containing the detergent formulation. The sealed container can be formed by any suitable method, including such processes and features as heat sealing, solvent welding, and adhesive sealing solution (e.g., with use of a water-soluble adhesive).

Some embodiments of the present invention will now be described in detail in the following Examples.

Film Forming Compositions

Film forming compositions were prepared for each of Compositions of FC1 and F1-F19 by mixing together the components in the weight proportions listed in TABLES 1-3.

TABLE 1

| Film Comp. | A1 (wt %) | B1 (wt %) | B2 (wt %) | C1 (wt %) | C2 (wt %) | D1 (wt %) | E1 (wt %) | F1 (wt %) | F2 (wt %) | G (wt %) | H (wt %) | I (wt %) | J (wt %) |
|---|---|---|---|---|---|---|---|---|---|---|---|---|---|
| FC1 | 0.00 | 41.70 | — | — | 23.70 | 10.70 | — | 18.40 | — | — | 0.90 | — | 4.60 |
| F1 | 18.30 | — | 61.30 | 7.60 | — | 9.70 | — | — | — | — | — | — | 3.10 |
| F2 | 19.47 | 65.07 | — | — | 8.08 | 7.38 | — | — | — | — | — | — | — |
| F3 | 36.16 | — | 22.25 | — | 22.24 | 9.53 | 4.76 | 0.10 | — | 0.24 | — | 4.73 | — |
| F4 | 35.99 | — | 11.33 | 33.72 | — | 9.42 | 4.52 | — | 0.10 | 0.24 | — | 4.69 | — |

TABLE 1-continued

| Film Comp. | A1 (wt %) | B1 (wt %) | B2 (wt %) | C1 (wt %) | C2 (wt %) | D1 (wt %) | E1 (wt %) | F1 (wt %) | F2 (wt %) | G (wt %) | H (wt %) | I (wt %) | J (wt %) |
|---|---|---|---|---|---|---|---|---|---|---|---|---|---|
| F5 | 35.99 | — | 11.33 | — | 33.72 | 9.42 | 4.52 | 0.10 | — | 0.24 | — | 4.69 | — |
| F6 | 58.08 | — | 11.40 | — | 11.42 | 9.46 | 4.56 | 0.10 | — | 0.24 | — | 4.73 | — |
| F7 | 58.01 | — | 11.39 | 11.34 | — | 9.45 | 4.60 | 0.10 | — | 0.25 | — | 4.86 | — |

A1—poly(vinyl alcohol), weight average molecular weight, Mw, of 67,000 Daltons and 88% hydrolyzed commercially available from Sigma-Aldrich
B1—Polyox ™ WSR 205 poly(ethylene oxide) with a weight average molecular weight of 600,000 Daltons available from The Dow Chemical Company
B2—Polyox ™ WSR N3000 poly(ethylene oxide) with a weight average molecular weight of 400,000 Daltons available from The Dow Chemical Company
C1—Synalox 40-D50 ethylene oxide and propylene oxide copolymer with a weight average molecular weight of 900 Daltons available from The Dow Chemical Company
C2—Synalox 40-D150 ethylene oxide and propylene oxide copolymer with a weight average molecular weight of 1,900 Daltons available from The Dow Chemical Company
D1—1,4-butanediol (100%) plasticizer available from Alfa Aesar
E1—Isobam ™ 110 poly(isobutylene-co-maleic anhydride) amide-$NH^{4+}$ commercially available from Kuraray Company Ltd.
F1—poly(vinyl pyrrolidone) with a weight average molecular weight of 29,000 Daltons commercially available from Acros Organics
F2—poly(vinyl pyrrolidone) with a weight average molecular weight of 1,300,000 Daltons commercially available from Acros Organics
G—CLOSITE $NA^+$ nanoclay (bentonite/montmorillonite) commercially available from BKY Additives Ltd.
H—Aqueous dispersion (15.3 wt %) containing magnesium stearate and potassium oleate
I—BYK-016 defoamer available from BYK, USA Inc.
J—Dow Corning ™ 74 Additive, a Silicon foam control agent available from Dow Corning Corporation

TABLE 2

| Film Comp. | A3 (wt %) | B2 (wt %) | C2 (wt %) | C3 (wt %) | D1 (wt %) | D2 (wt %) | E1 (wt %) | F1 (wt %) | G (wt %) | H (wt %) | I (wt %) | J (wt %) | K (wt %) |
|---|---|---|---|---|---|---|---|---|---|---|---|---|---|
| F8  | 57.98 | 11.38 | —     | 11.40 | 9.44  | —     | 4.59 | 0.10 | 0.25 | — | 4.86 | — | —    |
| F9  | 58.25 | 11.33 | 11.34 | —     | 9.39  | —     | 4.58 | 0.10 | 0.24 | — | 4.76 | — | —    |
| F10 | 56.81 | 11.04 | 10.99 | —     | 9.29  | —     | 4.84 | 0.10 | 0.24 | — | 4.71 | — | 1.98 |
| F11 | 58.25 | 11.53 | —     | 3.94  | 1.56  | 14.74 | 4.65 | 0.11 | 0.27 | — | 4.96 | — | —    |
| F12 | 57.94 | 11.48 | —     | 3.92  | 1.55  | 14.68 | 4.63 | 0.11 | 0.26 | — | 4.91 | — | 0.50 |
| F13 | 57.64 | 11.42 | —     | 3.90  | 1.55  | 14.61 | 4.61 | 0.11 | 0.26 | — | 4.88 | — | 1.03 |
| F14 | 56.97 | 11.29 | —     | 3.85  | 1.53  | 14.44 | 4.55 | 0.11 | 0.26 | — | 4.83 | — | 2.18 |
| F15 | 61.07 | 12.10 | —     | 4.11  | 1.66  | 15.50 | —    | 0.12 | 0.30 | — | 5.15 | — | —    |
| F16 | 60.44 | 11.97 | —     | 4.06  | 1.64  | 15.34 | —    | 0.12 | 0.29 | — | 5.10 | — | 1.04 |

A3—poly(vinyl alcohol), weight average molecular weight, Mw, of 150,000 Daltons and 88% hydrolyzed available from Sigma-Aldrich
B2—Polyox ™ WSR N3000 poly(ethylene oxide) with a weight average molecular weight of 400,000 Daltons available from The Dow Chemical Company
C2—Synalox 40-D150 ethylene oxide and propylene oxide copolymer with a weight average molecular weight of 1,900 Daltons available from The Dow Chemical Company
C3—UCON 75-H-450 ethylene oxide and propylene oxide copolymer, number average molecular weight, MN, of 980 Daltons available from The Dow Chemical Company.
D1—1,4-butanediol (100%) plasticizer available from Alfa Aesar
D2—Glycerol (100%) plasticizer available from Sigma-Aldrich
E1—Isobam ™ 110 poly(isobutylene-co-maleic anhydride) amide-$NH^{4+}$ commercially available from Kuraray Company Ltd.
F1—poly(vinyl pyrrolidone) with a weight average molecular weight of 29,000 Daltons commercially available from Acros Organics
G—CLOSITE $NA^+$ nanoclay (bentonite/montmorillonite) commercially available from BKY Additives Ltd.
H—Aqueous dispersion (15.3 wt %) containing magnesium stearate and potassium oleate
I—BYK-016 defoamer available from BYK, USA Inc.
J—Dow Corning ™ Additive, a Silicon foam control agent available from Dow Corning Corporation
K—Calcium chloride, anhydrous (96%) complexing agent available from Acros Organics.

TABLE 3

| Film Comp. | A2 (wt %) | B2 (wt %) | C3 (wt %) | D1 (wt %) | D2 (wt %) | E1 (wt %) | E2 (wt %) | E3 (wt %) | F1 (wt %) | G (wt %) | I (wt %) | J (wt %) | K (wt %) |
|---|---|---|---|---|---|---|---|---|---|---|---|---|---|
| F17 | 58.38 | 11.58 | 3.88 | 1.57 | 14.57 | 4.67 | —    | —    | 0.11 | 0.27 | 4.97 | — | — |
| F18 | 58.35 | 11.57 | 3.81 | 1.50 | 14.77 | —    | 4.74 | —    | 0.11 | 0.26 | 4.90 | — | — |
| F19 | 58.21 | 11.56 | 3.73 | 1.63 | 14.73 | —    | —    | 4.78 | 0.12 | 0.28 | 4.96 | — | — |

A2—poly(vinyl alcohol), weight average molecular weight, Mw, of 130,000 Daltons and 88% hydrolyzed available from Sigma-Aldrich
B2—Polyox ™ WSR N3000 poly(ethylene oxide) with a weight average molecular weight of 400,000 Daltons available from The Dow Chemical Company
C3—UCON 75-H-450 ethylene oxide and propylene oxide copolymer, number average molecular weight, MN, of 980 Daltons available from The Dow Chemical Company.
D1—1,4-butanediol (100%) plasticizer available from Alfa Aesar
D2—Glycerol (100%) plasticizer available from Sigma-Aldrich
E1—Isobam ™ 110 poly(isobutylene-co-maleic anhydride) amide-$NH^{4+}$ commercially available from Kuraray Company Ltd.
E2—Isobam ™ 10 poly(isobutylene-co-maleic anhydride) available from Kuraray Company Ltd, reacted with NaOH TABLE 3-continued

| Film Comp. | A2 (wt %) | B2 (wt %) | C3 (wt %) | D1 (wt %) | D2 (wt %) | E1 (wt %) | E2 (wt %) | E3 (wt %) | F1 (wt %) | G (wt %) | I (wt %) | J (wt %) | K (wt %) |
|---|---|---|---|---|---|---|---|---|---|---|---|---|---|

E3—Acusol ™ 588 dispersant (polyacrylate copolymer) available from The Dow Chemical Company, reacted with NaOH
F1—poly(vinyl pyrrolidone) with a weight average molecular weight of 29,000 Daltons commercially available from Acros Organics
G—CLOSITE NA+ nanoclay (bentonite/montmorillonite) commercially available from BKY Additives Ltd.
I—BYK-016 defoamer available from BYK, USA Inc.
J—Dow Corning ™ 74 Additive, a Silicon foam control agent available from Dow Corning Corporation
K—Calcium chloride, anhydrous (96%) complexing agent available from Acros Organics.

Comparative Example C1 and Examples 1-19

A film was prepared in each of Comparative Example C1 and Examples 1-19 by casting 15 to 25 grams of the film forming composition of FC1 and F1-F19, respectively as noted in TABLE 4, onto a polyethylene terephthalate substrate using a stainless steel draw down bar to form a dried film with a target thickness of 76 μm. The drawn films were immediately transferred to a forced air oven and dried at 65-95° C. for 10 to 15 minutes to form a dried film. The dried films were then removed from the oven and left to equilibrate to room temperature for several hours. Once the films were equilibrated to room temperature, the films were released from the polyethylene terephthalate substrate to provide free standing films 60 to 90 μm thick.

TABLE 4

| Ex. | Film composition |
|---|---|
| C1 | FC1 |
| 1 | F1 |
| 2 | F2 |
| 3 | F3 |
| 4 | F4 |
| 5 | F5 |
| 6 | F6 |
| 7 | F7 |
| 8 | F8 |
| 9 | F9 |
| 10 | F10 |
| 11 | F11 |
| 12 | F12 |
| 13 | F13 |
| 14 | F14 |
| 15 | F15 |
| 16 | F16 |
| 17 | F17 |
| 18 | F18 |
| 19 | F19 |

Cold Water Solubility Testing

A commercially available modified polyvinyl hydroxide film and the free standing films from Comparative Example C1 and Examples 1-19 were tested for cold water solubility by taking test strips (0.5" wide×1.5" long) from each free standing film and placing same into a separate container with 20 mL of tap water. The test strips were allowed to sit undisturbed for approximately 2 mins before shaking the container for 60 seconds by hand. The container contents were then filtered through a 25 μm mesh screen. The following rating scale based on observation of the container contents pre-filtering and of the residue on the mesh screen was used to characterize the overall cold water solubility for the subject free standing films.
Excellent=Clear solution, no residue on screen
Very Good=Slight haze, no residue on screen
Good=low residue/fine grit on screen
Fair=large amount of residue/grit on screen
Poor=large intact film fragments on screen
The results of the analyses are provided in TABLE 5.

TABLE 5

| Film Tested | Cold water solubility |
|---|---|
| modified polyvinyl hydroxide film* | Excellent |
| C1 | Excellent |
| 1 | Excellent |
| 2 | Excellent |
| 3 | Very Good |
| 4 | Very Good |
| 5 | Very Good |
| 6 | Very Good |
| 7 | Very Good |
| 8 | Very Good |
| 9 | Very Good |
| 10 | Very Good |
| 11 | Very Good |
| 12 | Very Good |
| 13 | Very Good |
| 14 | Very Good |
| 15 | Very Good |
| 16 | Very Good |
| 17 | Very Good |
| 18 | Very Good |
| 19 | Very Good |

*Monosol ™ M8630 modified polyvinyl hydroxide film available from MonoSol LLC

Storage Stability Testing

A commercially available modified polyvinyl hydroxide film and the free standing films from Comparative Example C1 and Examples 1-19 were tested for storage stability by physically examining the films for brittleness and stickiness or residue following storage at ambient temperatures (68-72° F.) and low (18-23% relative humidity) and high (68-70% relative humidity). A pass/fail rating scale was used, wherein
pass=film maintained toughness and flexibility after storage at conditions for 1 week
fail=film becomes brittle after storage at conditions for 1 week.
The free standing films were also observed for the present of residue. The following rating scale was used
None=no oily residue observed on film surface
Low=low oily residue observed on film surface
Moderate=moderate oily residue observed on film surface
Heavy=significant amount of oily residue observed on film surface
The free standing films were evaluated for blocking (unwanted adhesion) by rolling the film onto itself under moderate hand pressure for several minutes and then unrolling the film. The results of the analyses are provided in TABLE 6.

TABLE 6

| Film Tested | Storage Stability | | | |
|---|---|---|---|---|
| | Low | High | Residue | Blocking |
| modified polyvinyl hydroxide film* | Pass | Pass | None | No |
| C1 | Pass | Pass | Moderate | No |
| 1 | Pass | Pass | None | No |
| 2 | Pass | Pass | None | No |
| 3 | Pass | Pass | Low | No |
| 4 | Pass | Pass | Low | No |
| 5 | Pass | Pass | Low | No |
| 6 | Pass | Pass | None | No |
| 7 | Pass | Pass | None | No |
| 8 | Pass | Pass | None | No |
| 9 | Pass | Pass | None | No |
| 10 | Pass | Pass | None | No |
| 11 | Pass | Pass | None | No |
| 12 | Pass | Pass | None | No |
| 13 | Pass | Pass | None | No |
| 14 | Pass | Pass | None | No |
| 15 | Pass | Pass | None | No |
| 16 | Pass | Pass | None | No |
| 17 | Pass | Pass | None | No |
| 18 | Pass | Pass | None | No |
| 19 | Pass | Pass | None | No |

*Monosol ™ M8630 modified polyvinyl hydroxide film available from MonoSol LLC.

Properties Testing

Mechanical properties of water soluble films believed useful in thermoforming water-soluble containers, include Tensile Stress at 100% elongation, Young's Modulus and Break Stress are critical for successful thermoforming and also in the film's ability to hold the required amount of liquid detergent. Mechanical properties of the commercially available modified polyvinyl hydroxide film and the free standing films from Comparative Example C1 and Examples 1-19 were measured using a Tinius Olsen Model H10K-S benchtop materials tester available from Tinius Olsen and film samples (3.0 inch long×0.5 inch wide). The tensile testing was performed according to ASTM D882 using a 1.2 inch gauge length at a test speed of 20 inch/min under ambient conditions in a controlled temperature and humidity room with a temperature and humidity of 71° F. and 53% relative humidity. The Elasticity Index, which is obtained by the ratio of tensile Stress at 100% Elongation and Young's Modulus (also known as Elastic Modulus) was used to predict the film's ability to undergo elastic (recoverable) or plastic (non-recoverable) deformation. A rating scale for Elastic Index was as follows.

Excellent=0.5 or higher

Very Good=0.4 to 0.49

Good=0.3 to 0.39

Fair=0.2 to 0.29

Poor=0.19 or lower

Without wishing to be bound by theory, it is believed that films having an Elasticity Index that is above 0.5 may provide for an elastic film that recovers back to its original shape and length upon stretch. Such a film provides for a firm and "inflated" pouch, or a full and plumb pouch. On the other hand, it is believed that a film having an Elasticity Index that is too low, i.e. less than about 0.2, is inelastic and may provide for a pouch that undergoes plastic deformation and hence does not return to its original length upon stretch. Such a pouch will appear limp and weak. The results of the analyses are provided in TABLE 7.

TABLE 7

| | Tensile Properties | | | | |
|---|---|---|---|---|---|
| Film | Elongation (%) | Stress @ 100% Elongation (MPa) | Ultimate Break Stress (MPa) | Young's Modulus (MPa) | Elasticity Index |
| modified polyvinyl hydroxide film* | 856 | 8.5 | 40.1 | 17.0 | 0.50 |
| Comparative Example FC1 | 1259 | 1.7 | 5.2 | 5.8 | 0.29 |
| Example 1 | 1092 | 4.6 | 9.2 | 41.1 | 0.11 |
| Example 2 | 1733 | 6.4 | 19.9 | 59.0 | 0.11 |
| Example 3 | 490 | 3.8 | 6.9 | 12.3 | 0.31 |
| Example 4 | 596 | 3.9 | 8.9 | 8.8 | 0.44 |
| Example 5 | 520 | 2.6 | 5.4 | 6.7 | 0.39 |
| Example 6 | 714 | 7.4 | 20.5 | 19.0 | 0.39 |
| Example 7 | 442 | 6.0 | 12.8 | 16.0 | 0.38 |
| Example 8 | 460 | 7.8 | 24.7 | 21.0 | 0.37 |
| Example 9 | 435 | 8.0 | 21.5 | 24.1 | 0.33 |
| Example 10 | 389 | 6.4 | 17.4 | 22.0 | 0.29 |
| Example 11 | 525 | 6.2 | 24.8 | 18.2 | 0.34 |
| Example 12 | 452 | 6.2 | 22.9 | 20.8 | 0.30 |
| Example 13 | 505 | 6.7 | 23.0 | 23.6 | 0.28 |
| Example 14 | 478 | 5.9 | 21.1 | 22.2 | 0.27 |
| Example 15 | 626 | 6.1 | 24.6 | 16.7 | 0.37 |
| Example 16 | 623 | 6.0 | 27.3 | 16.4 | 0.37 |
| Example 17 | 520 | 5.6 | 21.1 | 13.7 | 0.41 |
| Example 18 | 469 | 5.6 | 20.6 | 14.1 | 0.40 |
| Example 19 | 435 | 6.3 | 17.5 | 18.7 | 0.34 |

*Monosol ™ M8630 modified polyvinyl hydroxide film available from MonoSol LLC.

Comparative Example PC2 and Examples P1-P19: Unit Dose Pouches

In each of Comparative Examples PC2 and Examples P1-P19 the unit dose pouch was prepared manually from two film pieces cut to 3 inch×2 inch from a film having the film composition noted in TABLE 8. The film pieces were stacked and heat sealed together along three edges to form an open pouch. The open pouch was then filled with 20 g of detergent. Then the fourth (open) edge of the pouch was then heat sealed to form the completed unit does pouch.

The detergent used in each of Comparative Example PC2 and Examples P1-P19 was prepared by combining in a 100 mL glass jar 15.4 g of anionic surfactant (Alpha-Step® PC anionic surfactant available from Stepan Company); 2.9 g of high active nonionic surfactant (Bio-Soft® N25-7 high active nonionic surfactant available from Stepan Company); and 2.8 g aqueous concentrated sodium lauryl ether sulfate solution (Steol® CS 270 aq. conc. sodium lauryl ether sulfate solution available from Stepan Company) and mixed using a FlackTek Speedmixer (Model DAC 150 FVZ-K) at 3540 rpm for one minute to form a slurry. Then, 6.0 g of deionized water was added to the slurry with mixing. Then, 3.0 g sodium chloride was added to the glass jar and the contents were mixed in the FlackTek Speed mixer at 3540 rpm for 3 minutes. The product detergent formulation was allowed to equilibrated overnight before use. The water content of the product detergent formulation was measured at 54 wt % by Karl-Fisher titration.

Unit Dose Pouch Accelerated High Temp. High Humidity Storage Stability

The unit does pouches were then placed in a small zip-lock bag and stored in a 37° C. and 70% relative humidity environment for 14 days. The unit dose pouches were then evaluated for any signs of film failure. The results of the observations are provided in TABLE 8.

Unit Dose Pouch Water Solubility/Dispersibility

Following the 14 day storage, each unit dose pouch was placed into a 1 L bottle filled with tap water. The contents of the 1 L bottle were then agitated with a stir bar for a period of 30 minutes and then evaluated for pouch solubility by filtering the bottle contents through a 25 µm mesh screen. The following rating scale based on observation of the bottle contents pre-filtering and of the residue on the mesh screen was used to characterize the overall cold water solubility for the subject free standing films.

Excellent=Clear solution, no residue on screen
Very Good=Slight haze, no residue on screen
Good=low residue/fine grit on screen
Fair=large amount of residue/grit on screen
Poor=large intact film fragments on screen
The results of the observations are provided in TABLE 8.

TABLE 8

| Unit Dose Pouch | Film Comp. | Storage Stability | Dissolution after storage |
|---|---|---|---|
| Comp. Example PC2 | * | Stable/Intact | Poor |
| Example P1 | F1 | Not stable after 1 hr | — |
| Example P2 | F2 | Not stable after 1 hr | — |
| Example P3 | F3 | Not stable after 2.5 days | — |
| Example P4 | F4 | Stable/Intact | Very Good |
| Example P5 | F5 | Stable/Intact | Fair |
| Example P6 | F6 | Stable/Intact | Fair |
| Example P7 | F7 | Stable/Intact | Good |
| Example P8 | F8 | Stable/Intact | Fair |
| Example P9 | F9 | Stable/Intact | Fair |
| Example P10 | F10 | Stable/Intact | Very Good |
| Example P11 | F11 | Stable/Intact | Fair |
| Example P12 | F12 | Stable/Intact | Very Good |
| Example P13 | F13 | Stable/Intact | Very Good |
| Example P14 | F14 | Stable/Intact | Very Good |
| Example P15 | F15 | Stable/Intact | Very Good |
| Example P16 | F16 | Stable/Intact | Very Good |
| Example P17 | F17 | Stable/Intact | Fair |
| Example P18 | F18 | Stable/Intact | Very Good |
| Example P19 | F19 | Stable/Intact | Very Good |

* Monosol ™ M8630 modified polyvinyl hydroxide film available from MonoSol LLC.

We claim:

1. A free standing film, comprising:
   19 to 85 wt % of a partially hydrolyzed polyvinyl acetate;
   5 to 70 wt % of a poly(ethylene oxide);
   1 to 35 wt % of a polyalkylene glycol;
   0.5 to 25 wt % of a plasticizer;
   1 to 7.5 wt % of a poly(isobutylene-co-maleic anhydride) copolymer, wherein the poly(isobutylene-co-maleic anhydride) copolymer is at least partially neutralized; and
   0 to 10 wt % of an optional additive.

2. The free standing film of claim 1, further comprises:
   0.01 to 1.8 wt % of a polyvinyl pyrrolidone;
   wherein the weight ratio of the partially hydrolyzed polyvinyl acetate to the polyvinyl pyrrolidone is >10:1.

3. The free standing film of claim 2, wherein the free standing film includes at least one optional additive selected from the group consisting of a nano clay, a defoamer, a crosslinking agent and mixtures thereof.

4. The free standing film of claim 3, wherein the free standing film contains:
   0.05 to 0.2 wt % of the polyvinyl pyrrolidone;
   wherein the at least one optional additive includes a nano clay and a defoamer; and wherein the free standing film contains:
   0.1 to 0.5 wt % of the nano clay; and
   3 to 7 wt % of the defoamer.

5. The free standing film of claim 1, wherein the free standing film is cold water soluble.

6. The free standing film of claim 1, wherein the free standing film forms a cavity.

7. The free standing film of claim 6, wherein the cavity is encapsulated by the free standing film.

8. A unit dose package, comprising:
   a free standing film of claim 1; and
   a detergent formulation, comprising:
      14 to 60 wt % of a surfactant;
      3 to 25 wt % of a salt; and
      20 to 75 wt % of a water;
   wherein the free standing film forms a cavity; wherein the detergent formulation is disposed within the cavity; and wherein the detergent formulation is in contact with the free standing film.

9. The unit dose package of claim 8, wherein the free standing film encapsulates the cavity.

* * * * *